C. A. WARD.
TRANSMISSION GEARING.
APPLICATION FILED FEB. 13, 1909.
963,839.
Patented July 12, 1910.
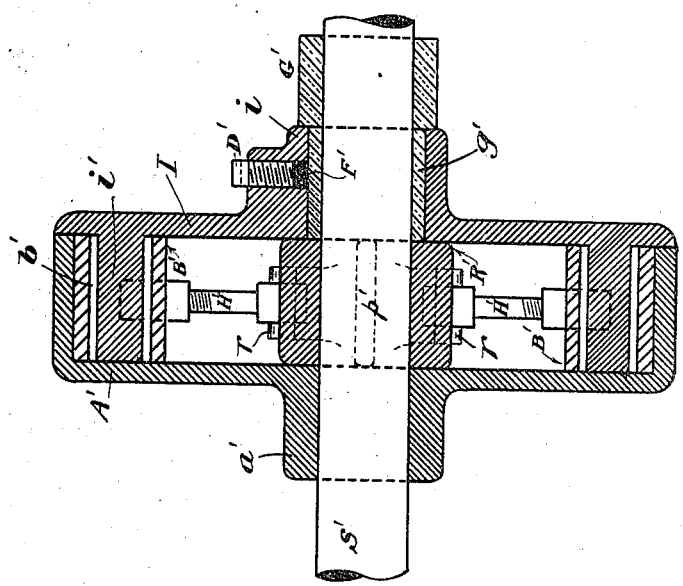
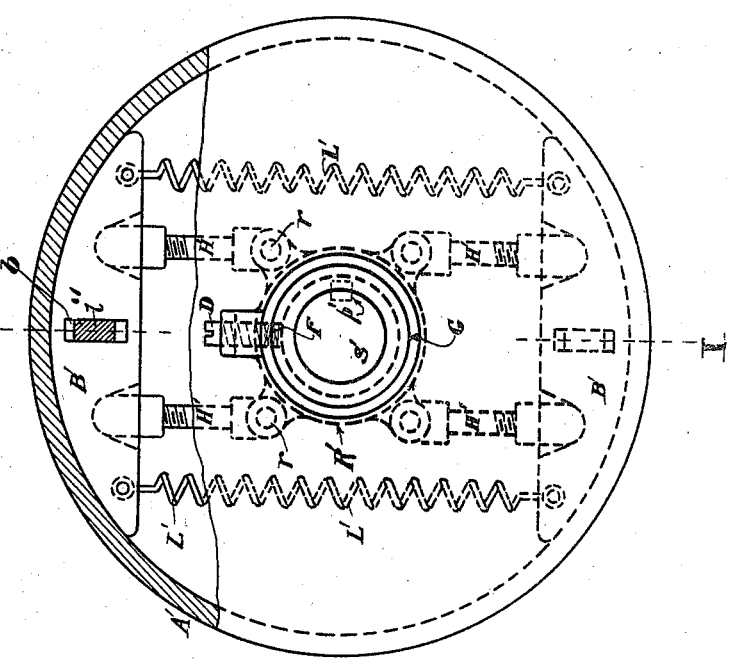
Witnesses:
Chas. S. Lipley
Henry Sens
Inventor:
Charles A. Ward
by C. M. Clarke
his Attorney

UNITED STATES PATENT OFFICE.

CHARLES A. WARD, OF PITTSBURG, PENNSYLVANIA.

TRANSMISSION-GEARING.

963,839. Specification of Letters Patent. Patented July 12, 1910.

Application filed February 13, 1909. Serial No. 477,691.

*To all whom it may concern:*

Be it known that I, CHARLES A. WARD, a citizen of the United States, residing at Pittsburg, in the county of Allegheny and State of Pennsylvania, have invented certain new and useful Improvements in Transmission-Gearing, of which the following is a specification, reference being had therein to the accompanying drawing.

My invention consists of an improvement in transmission gearing for traction vehicles or any other use to which it is adapted, and is particularly designed to provide means whereby the axle of the vehicle, or a driving counter-shaft, geared with any suitable power-imparting means, as an engine, may be employed to impart rotation to either or both wheels of the axle and to permit slippage of either wheel when running faster than the axle, as in turning corners, and automatic engagement therewith for driving at the normal speed of the axle.

The invention is designed to combine with the hub of the wheels, suitable clutch mechanism adapted to be normally maintained in disengaged relation with the hub and to be coupled therewith automatically due to the rotation of the axle, in either direction, with means for insuring engagement of the parts for operation when desired.

In the accompanying drawings Figure 1 is a view in end elevation of the hub element and its parts, partly broken away. Fig. 2 is a vertical sectional view indicated by the line I, I, of Fig. 1.

As shown in the drawings, the axle S' is mounted in bearings G' having similar sleeves $g'$, the wheel hub A' being mounted by its sleeve $a'$ rotatably upon the axle. The wheel hub is however, provided with a companion casing or head I covering the hub cavity and frictionally held against rotation, and bearing by its hub sleeve $i$ upon the bearing extension $g'$. Said hub $i$ is provided with a holding friction plug F' and an adjusting set screw D' for frictional engagement with said bearing extension.

B' represents friction shoes, one at each opposite side of the axle, or of any number desired, said shoes being rounded to fit within the inner periphery of the wheel hub A' as clearly shown, for frictional engagement therewith when pressed outwardly as hereinafter described.

The head I is provided with inwardly extending holding or locking keys $i'$ in suitable receiving slots $b'$ of shoes B', thereby providing guiding and centralizing means for said shoes.

Keyed to the axle S' by a key $p'$ is a hub R' connected by radially extending pivoting lugs or sockets $r$ and pairs of pitmen H', with the inner faces of shoes B'. The outer ends of pitmen H' extend as shown, into suitable receiving sockets on the inner sides of shoes B' or are connected therewith in any other suitable manner.

The shoes B' are normally tended to be retracted from frictional engagement by means of springs L', permitting the wheel and its hub to rotate upon the axle independently of the clutch mechanism, when the speed of the axle is slower than that of the wheels or when the axle is relatively stationary.

The operation of this construction is as follows: Upon rotation of axle S' the shoes, by means of the rotating hub R' and pitmen H', (one at each side only operating) will be thrust outwardly into binding engagement with the inner periphery of the hub and will impart rotative travel thereto and resulting traction. Upon the speed of the wheel exceeding that of the axle, the shoes B' will be separated therefrom by the rotation of the wheel and the retractive effect of springs L' and the wheel will remain uncoupled from the coupling mechanism as long as these conditions continue, or until the speed of the axle tends to exceed that of the wheel.

The mechanism may be applied with equally good results to a counter-shaft geared with the prime mover, the counter-shaft being geared with the axle wheels through sprocket mechanism or other suitable means, and either arrangement will operate to produce the effects desired. In addition to the advantages noted, I avoid the necessity of making the axle in two sections with the accompanying usual differential gearing, thus securing the advantages of strength and simplicity inherent in a one-piece axle.

While the construction shown and described is the preferred one for carrying out my invention, it will be understood that it may be variously changed or modified by the skilled mechanic to secure the same results, and that all such changes are to be considered as within the scope of the following claims.

What I claim is:—

1. The combination with a shaft and a bearing therefor, of a wheel freely mounted on the shaft and having an inner annular periphery, a companion head rotatably mounted on the bearing and engaging the periphery of said wheel, a hub secured to the shaft, oppositely arranged friction shoes, means connecting the shoes with the companion head, and pairs of pitmen connecting the shoes with the hub at opposite sides thereof, one pitman of each pair being operative to press the shoe into engagement with the wheel when the speed of the hub tends to exceed from the speed of the wheel, substantially as set forth.

2. The combination with a shaft and a bearing therefor, of a wheel freely mounted on the shaft and having an inner annular periphery, a companion head rotatably mounted on the bearing and engaging the periphery of said wheel, a hub secured to the shaft, oppositely arranged friction shoes, means connecting the shoes with the companion head, pairs of pitmen connecting the shoes with the hub at opposite sides thereof, one pitman of each pair being operative to press the shoe into engagement with the wheel when the speed of the hub tends to exceed from the speed of the wheel, and means for retracting the shoes, substantially as set forth.

3. The combination with a shaft and a bearing therefor, of a wheel freely mounted on the shaft having an inner annular periphery, a companion head mounted on the bearing, a hub secured to the shaft, oppositely arranged friction shoes, a plurality of pitmen connecting each shoe with the hub, and means extending inwardly from the companion head and engaging the shoes providing guiding means therefor, substantially as set forth.

4. The combination with a shaft and a bearing therefor, of a wheel freely mounted on the shaft having an inner annular periphery, a companion head mounted on the bearing and engaging said wheel, a hub secured to the shaft, oppositely arranged friction shoes fixedly engaging the companion head against lateral movement but having a limited radial movement independent thereof, a plurality of pitmen connecting each shoe with the hub, and springs connecting the shoes, substantially as set forth.

5. The combination with the axle and its bearing having an extended sleeve, of a vehicle wheel freely mounted by its hub upon the axle, oppositely arranged clutching shoes adapted to frictionally engage the interior of the wheel, a companion head mounted on the sleeve with friction mechanism and engaging the vehicle wheel hub, means connecting the companion head with said shoes, an inner hub in rigid engagement with the shaft having oppositely arranged pairs of pitmen engaging the shoes at each side of the center thereof, and means for retracting the shoes, substantially as set forth.

6. The combination with the axle and its bearing having an extended sleeve, of a vehicle wheel freely mounted by its hub upon the axle, oppositely arranged clutching shoes adapted to frictionally engage the interior of the wheel, a companion head mounted on the sleeve with friction mechanism, a hub in rigid engagement with the shaft having pitmen engaging the shoes at each side of the center thereof, springs connecting the shoes, and centering keys extending inwardly from the companion head and engaging the shoes, substantially as set forth.

In testimony whereof I affix my signature in presence of two witnesses.

CHARLES A. WARD.

Witnesses:
C. M. CLARKE,
CHAS. S. LEPLEY.